(12) United States Patent
Jones-Lawlor

(10) Patent No.: US 6,730,889 B1
(45) Date of Patent: May 4, 2004

(54) PROGRAMMABLE SLOW-COOKER ACCESSORY

(75) Inventor: Heather M. Jones-Lawlor, Newton, MA (US)

(73) Assignee: The Holmes Group, Inc., Milford, MA (US)

( * ) Notice: Subject to any disclaimer, the term of this patent is extended or adjusted under 35 U.S.C. 154(b) by 221 days.

(21) Appl. No.: 09/940,845

(22) Filed: Aug. 28, 2001

Related U.S. Application Data

(60) Provisional application No. 60/196,273, filed on Apr. 5, 2000, and provisional application No. 60/189,443, filed on Mar. 15, 2000.

(51) Int. Cl.⁷ ............................ H05B 1/02; F27D 11/02
(52) U.S. Cl. ...................................... 219/506; 219/435
(58) Field of Search .................. 219/428, 429, 219/430, 432, 433, 435, 436, 438, 441, 490, 492, 506, 507, 509, 510; 99/325, 327, 331, 332, 339, 340; 307/141, 141.4; 361/195

(56) References Cited

U.S. PATENT DOCUMENTS

| | | | |
|---|---|---|---|
| 4,313,051 A | 1/1982 | Aoshima | |
| 4,345,145 A | 8/1982 | Norwood | |
| 4,551,590 A | 11/1985 | Mahon | |
| 4,566,802 A | 1/1986 | Koehler | |
| 4,644,137 A * | 2/1987 | Asahi et al. | 219/497 |
| 4,668,878 A | 5/1987 | Wyss | |
| 4,674,890 A | 6/1987 | Kojima et al. | |
| 4,687,910 A * | 8/1987 | Aoshima et al. | 219/506 |
| 4,695,683 A | 9/1987 | Wingler et al. | |
| 4,695,710 A | 9/1987 | Yamashita et al. | |
| 4,749,874 A | 6/1988 | Meisner et al. | |
| 4,764,715 A | 8/1988 | Kowalewski et al. | |
| 4,789,761 A | 12/1988 | Malone et al. | |
| 4,835,349 A | 5/1989 | Weber | |
| 4,841,496 A | 6/1989 | Adams et al. | |
| 4,857,758 A | 8/1989 | Rigazio et al. | |
| 4,959,512 A | 9/1990 | Cole et al. | |
| 5,191,231 A | 3/1993 | Berry | |
| 5,258,656 A * | 11/1993 | Pawlick | 307/141 |
| 5,430,598 A | 7/1995 | Rodolfo et al. | |
| 5,558,086 A * | 9/1996 | Smith et al. | 128/204.26 |
| 5,596,552 A | 1/1997 | Lim | |
| 5,615,604 A | 4/1997 | Chenglin | |
| 5,771,207 A | 6/1998 | Muroi et al. | |
| 5,834,718 A | 11/1998 | Amonett | |
| 6,104,602 A * | 8/2000 | Morris et al. | 361/678 |
| 6,191,393 B1 * | 2/2001 | Park | 219/439 |
| 6,229,507 B1 * | 5/2001 | Nakamura et al. | 345/82 |
| 6,362,459 B1 | 3/2002 | Schmidt | |
| 6,570,139 B1 | 5/2003 | Levy et al. | |
| 6,573,483 B1 | 6/2003 | DeCobert et al. | |

* cited by examiner

Primary Examiner—Sang Paik
(74) Attorney, Agent, or Firm—Hoffmann & Baron, LLP; Frank E. Marino

(57) ABSTRACT

A programmable slow-cooker add-on accessory, in which a user plugs a slow-cooker appliance into the accessory, and plugs the accessory into a wall socket or other source of power. The user sets a time and temperature for cooking a food item. The programmable accessory controls the time and temperature of the slow-cooker and enables the slow-cooker to cook at a desired time and temperature, and afterwards to keep the food warm.

14 Claims, 6 Drawing Sheets

PROGRAMMABLE SLOW-COOKER ACCESSORY

PROGRAMMABLE SLOW-COOKER ACCESSORY

This application claims priority to non-provisional application 09/802,174, filed Mar. 8, 2001, entitled "Slow Cooker Appliance," which in turn claims priority to U.S. Provisional Application 60/189,443, filed Mar. 15, 2000, and U.S. Provisional Application No. 60/196,273, filed Apr. 5, 2000, all of which are hereby incorporated by reference.

BACKGROUND OF THE INVENTION

Time and convenience are in short supply for homemakers wishing to supply a home-cooked meal to family members. Some appliances, such as slow-cooker appliances, attempt to meet this need by providing all-day cooking while a homemaker is absent. Such appliances, however, tend to be of the type where only one temperature and all day cooking is possible, regardless of the food item. This method of cooking potentially subjects the food item to over or undercooking. Another option may be to use a cooking unit with a controller, where a user may set a desired time or temperature. These units, however, tend to be more expensive and larger than simpler slow-cooker appliances. Furthermore, a wide variety of existing slow-cooker appliances exist and are already present in homes. The consumer may not always be willing to purchase a second slow cooker to obtain the programmable features.

What is needed is a device and a method to convert a conventional slow-cooker appliance into an appliance in which the homemaker can control the time and temperature of cooking and in which the controller does not become overheated and damaged by the heating element.

SUMMARY OF THE INVENTION

The invention is a programmable slow-cooker add-on accessory, connected between a slow-cooker appliance and a source of electric power, such as a wall electric outlet. In one embodiment, the accessory comprises a housing having two electrical connectors, and includes a programmable controller mounted within the housing to control a conventional slow-cooker appliance. In another embodiment of the invention, the electric connectors comprise a male and a female connector, the male connector for connection to a wall outlet, and a female connector for connection to the slow-cooker appliance.

Another aspect of the invention is a method of using the programmable controller to ensure that food is cooked according to the desires of a user. The user provides a food item and places the food item into the slow-cooker appliance, as described above. The user sets a cooking time and temperature for the programmable slow-cooker accessory, using the controller to set both the time and the temperature. The cooking time according to one embodiment may not be set less than four hours, and the temperature may not be set for less than 150 degrees Fahrenheit (66 degrees Celsius). This prevents a user from accidentally setting the accessory to a "warm" temperature, in which food would only be warmed but not cooked thoroughly before consumption. In one embodiment, if the user sets no time or temperature, but merely turns the cooker on, the cooker defaults to a particular time and temperature. The time and temperature are set by the user or the factory, such as a default setting of four hours and 175 degrees Fahrenheit or eight hours and 150 degrees Fahrenheit.

DESCRIPTION OF THE PREFERRED EMBODIMENT

Figure 1:
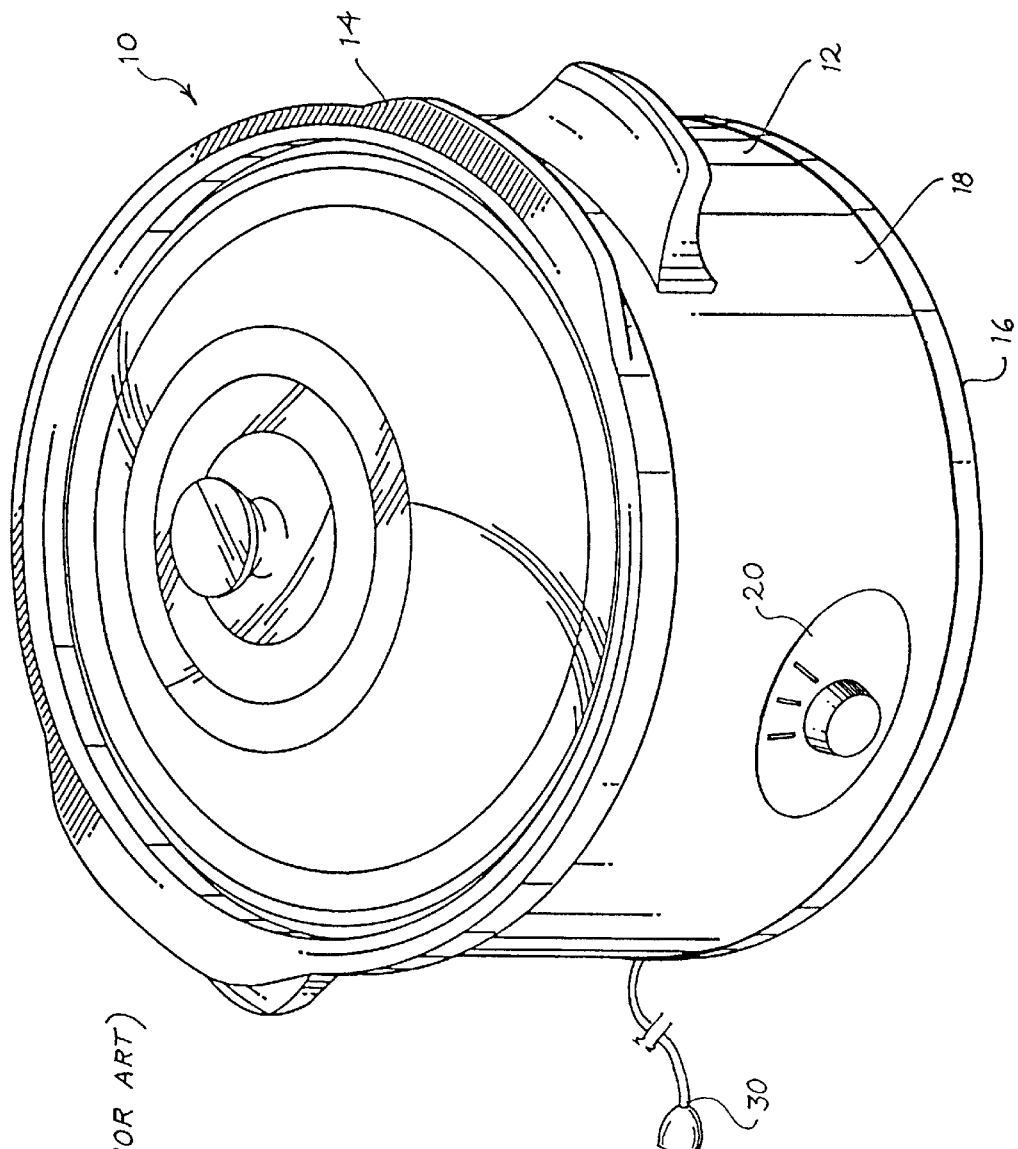
FIG. 1 is a perspective view of an embodiment of a prior art conventional slow-cooker appliance having no programming capability.

Referring to FIG. 1, one prior art embodiment of a food-heating slow-cooker appliance 10 is shown. An exemplary slow cooker appliance 10 may be a Crock-Pot® Slow Cooker made by The Rival Division of The Holmes Group® of Milford, Mass. The heating unit 12 preferably has a bottom 16 and a continuous outer sidewall 18. The bottom 16 and an interior sidewall define a well-like heating chamber having an oval or a round cross-section. A removable, washable cooking vessel 14 fits into the appliance, the vessel typically used to hold food for the cooking process. The heating chamber has a heating element disposed therein and mounted to the heating unit, either under the bottom 16 or additionally between the outer sidewall 18 and the interior sidewall. A control switch 20 is conventionally used to provide electricity to the heating element. The heating element functions to heat the cooking unit via the heating chamber. Manufacturers typically furnish slow-cooker appliances with an electrical cord and a male plug-in 30 for connection to a kitchen electrical outlet.

A user typically places food into the slow-cooker appliance and turns the switch 20 from an OFF position to a heat setting, such as LOW or MED or HIGH, depending on the positions available and according to the desires of the user. With this type of slow-cooker appliance, the user is unable to automatically regulate the temperature any further during the cooking cycle. As an example, if the user places food in the slow-cooker in the morning, and sets the temperature, there is no provision for removing heat, turning the heat down, or turning the heat off during the remainder of the day, other than by manually unplugging the unit. As a result, the slow cooker cooks at one setting during the day, and is unable to further regulate the heat provided.

Figure 2:
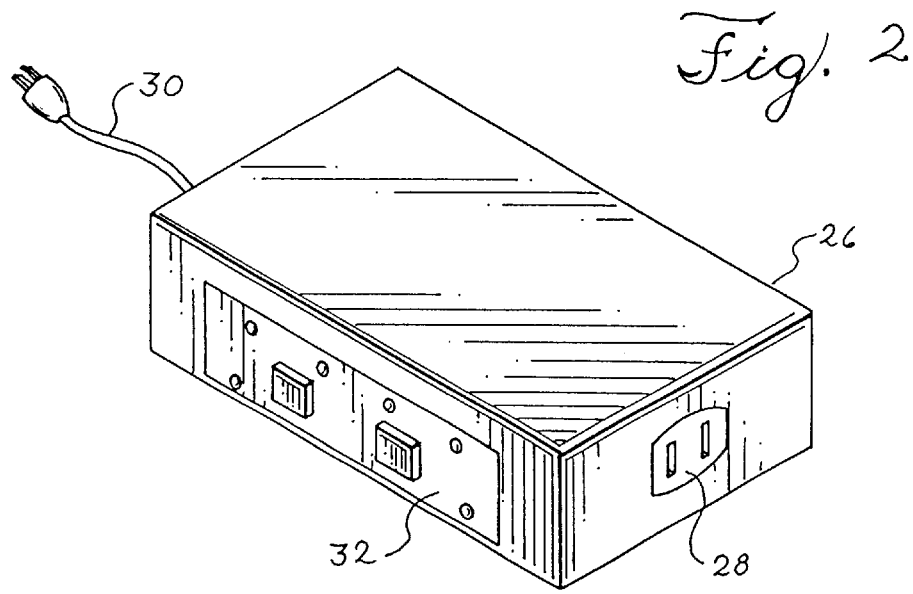
FIG. 2 is a perspective view of a slow cooker appliance accessory incorporating the present invention.

In one embodiment of the invention, an add-on accessory is provided, as shown in FIG. 2. The programmable slow-cooker accessory includes a housing 26 having a female electrical connector 28 for connection to the slow-cooker appliance, and a cord with a male electrical connector 30 for connection with a power source, such as a wall electrical outlet. The accessory has a controller and wiring on the inside, and has a control panel 32 on its face or outside, for the convenience of the user.

Figure 3:
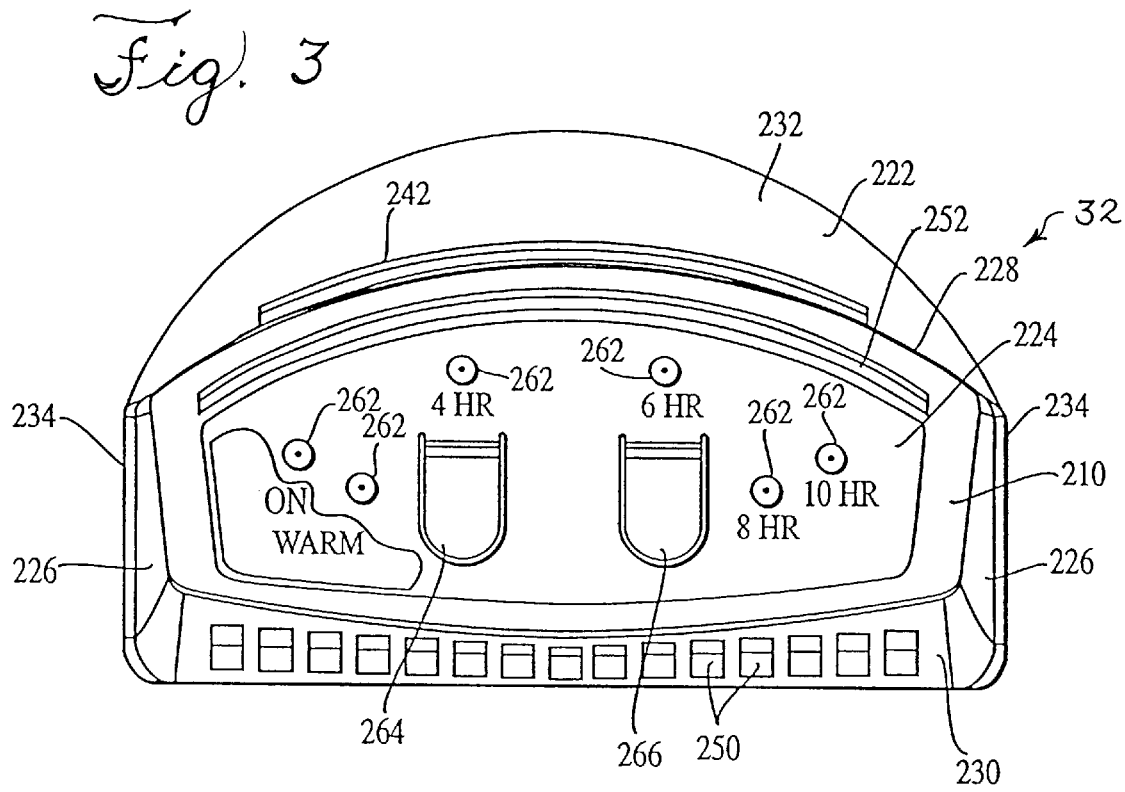
FIG. 3 is a view of a portion of a user interface.

To use the add-on accessory, the user plugs the slow-cooker appliance into the accessory and plugs the accessory into a source of electrical power, preferably a wall outlet. The user then turns the switch on the slow-cooker to the highest setting available, and sets the desired cooking temperature and time using the programmable controller and the control panel 32. As shown in FIG. 3, the housing 26 preferably includes a control panel user interface 32 located on a front surface of the housing 26.

The control panel 32 includes a plurality of indicator lights, such as LEDs 262, spaced on the front panel 224. As is well-known in the art, a variety of other indicator devices may be provided, including digital readouts, audible alarms, liquid crystal displays, incandescent lamps or fluorescent readouts. Preferably, the control panel 224 also includes a plurality of cantilevered portions 264 and 266 as shown in FIG. 3. The cantilevered portions 264, 266 interface with switches shown in the circuit diagram of FIG. 4. A water-impermeable label membrane may be applied over the front of the control panel 224 to label the indicators 262 and cantilevered portions 264 and 266 for the user. The membrane may also protect the front control panel 224 from damage from spilled foods or liquids and facilitate cleaning. The rest of the housing may be similarly waterproofed or sealed.

Air circulation may be promoted through the accessory through a set of openings, preferably defined between the upper portion and the bottom of the housing 26. In particular, a plurality of openings 250 are defined toward the bottom of the face of the housing. An elongated upper slot 252 is provided on the front face 224 of the housing 210. Alternatively, a plurality of openings may be used on top, or a long slot may be used on the bottom, to encourage airflow and dissipate heat from the accessory. This allows air to freely circulate behind the control panel 224 and assist in the dissipation of heat from the circuit board 254 and its electronic componentry within the accessory and the housing.

Figure 4:
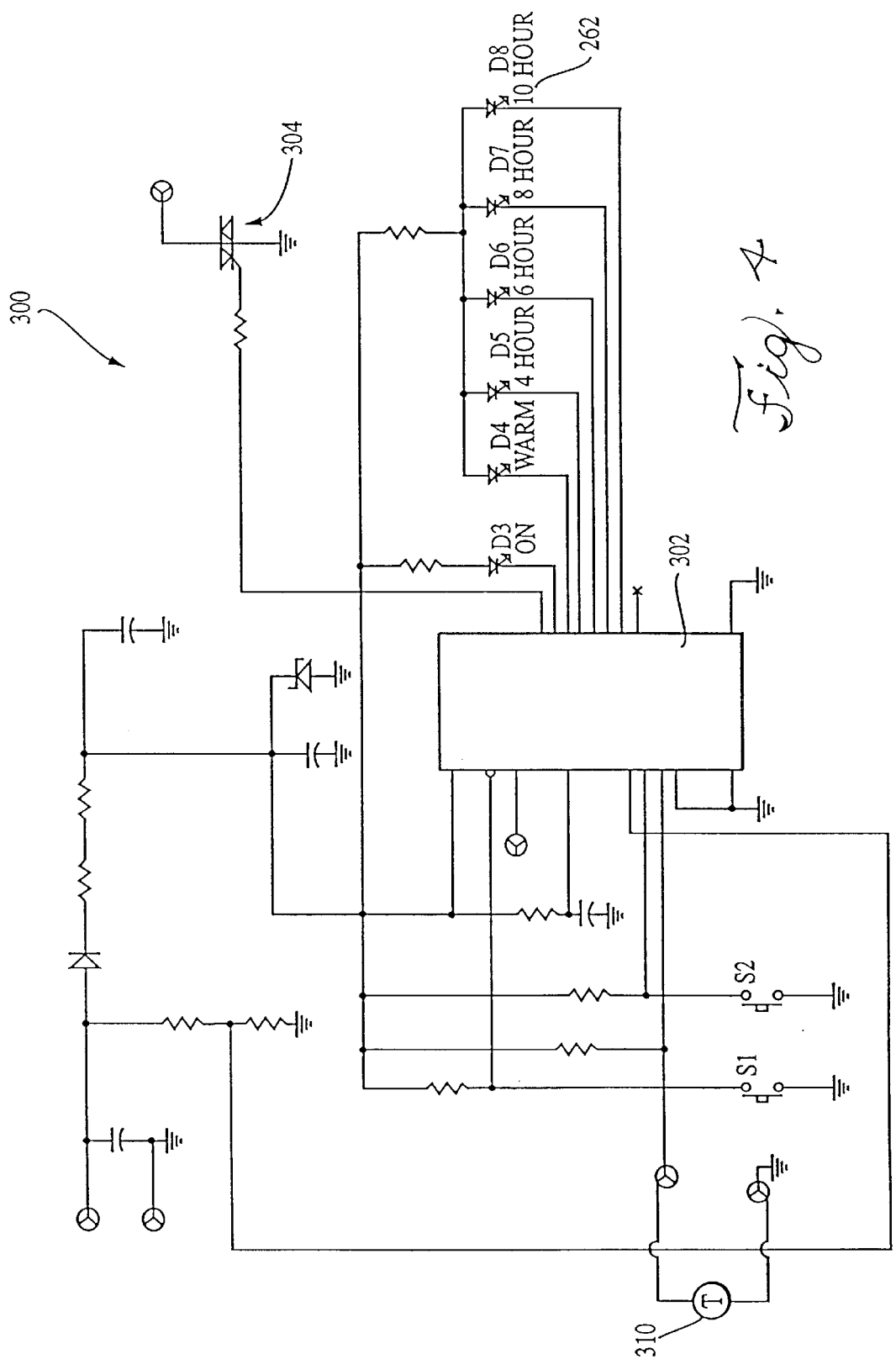
FIG. 4 is an embodiment of a wiring diagram for the accessory of FIG. 3.

A schematic diagram of the electronic circuitry and components is shown in FIG. 4. The diagram shows an exemplary circuit incorporating components as utilized in a preferred embodiment of the present invention. One skilled in the art will recognize that the componentry illustrated herein is exemplary only and that many other components may be substituted to achieve the functions described herein. Only the major components of FIG. 4 will be described herein. A circuit board (not shown) may mount all or part of the circuitry and logic allowing the user of the programmable appliance accessory to electronically control and program cooking cycles and temperature.

First, as shown in the diagram, the preferred circuit 300 is preferably built around an EPROM/ROM-based CMOS microprocessor controller 302, such as the PIC16CR54C RISC CPU manufactured by Microchip Technology, Inc. The chip output preferably includes circuited drivers for 6 LED indicators 262 (labeled D3–D8) as shown. These LED indicators may be assigned labels as follows:

| LED | Indicates |
| --- | --- |
| D3 | On |
| D4 | WARM |
| D5 | 4 HOUR |
| D6 | 6 HOUR |
| D7 | 8 HOUR |
| D8 | 10 HOUR |

Two momentary pushbutton contact switches S1 and S2 are used to trigger the "Off" and "Cook" features, respectively, as will be described in the cooking procedure below. Of course, other indicators and switches may be substituted. Note that while examples are given, the circuitry may be implemented in numerous ways, as is well-known in the art, to accomplish the varying programming modes described below. The temperature of the slow-cooker is typically measured using a thermistor 310, which is connected externally from the circuit board to the underside of the bottom of the heating chamber. The thermistor is held in thermal contact with the slow-cooker appliance. The thermistor provides for feedback and thus temperature control for the cooking vessel. In other embodiments, the slow cooker accessory provides a timing function only with no temperature element and no temperature feedback, and acts to allow high power, low power, or no power to the cooking vessel, in accordance with the desires of the user and the capabilities of the cooking vessel controller and the accessory. This may be accomplished by allowing preset percentages of power for "high" and "warm" settings for times according to preferences of a user.

In one embodiment, triac 304 is a logic Triac Model L4008L6-ND manufactured by Digi-Key, Inc. The triac is utilized to switch the power supplied to the heating elements of the appliance. Preferably, the Triac is of an isolated tab type and includes a heat sink tab for further dissipation of heat.

The operation of the appliance 10 is as follows. The programmable circuitry 300 allows the user to set both the temperature and desired time for cooking. The functions of the switches S1 and S2, which are activatable via the cantilevered portions 264 and 266 of the control panel 224, are as follows:

S1. OFF pushbutton—turns the appliance 10 off.
S2. COOK pushbutton—subsequent pushes of the button cycle through 4 hour, 6 hour, 8 hour and 10 hour cook times.

When the unit is plugged in, the power "on" indicator flashes. The user then pushes the COOK button (switch S2) to set the temperature and cooking time. As the user pushes the COOK switch S2, the LED's D5–D8 illuminate to indicate the corresponding time setting as follows.

LEDs
D3. POWER—on when appliance 10 is in cook or warm modes.
D5. 4 HOUR—on when appliance is in 4-hour cook mode
D6. 6 HOUR—on when appliance is in 6-hour cook mode
D7. 8 HOUR—on when appliance is in 8-hour cook mode
D8. 10 HOUR—on when appliance is in 10-hour cook mode
D4. WARM—on when appliance is in half-power mode Thus, subsequent pushes of the COOK switch S2 activate different cooking modes, as shown by the 6 HOUR, 8 HOUR and 10 HOUR LEDs 262 on the control panel 224. If the COOK switch S2 is pressed in the 10 HOUR mode, the controller recycles to the 4 HOUR cooking mode and its indicator.

In general, full power will be applied to the heating element 24 until the time corresponding to the illuminated LED elapses, after which the power to the heating element 24 is reduced by half, the WARM indicator illuminates and all cook time indicators extinguish. The choices of operation are: 4 or 6 hours on a HI temperature, and 8 to 10 hours on a lower temperature setting. Once the user selects the desired setting, the appliance 10 starts the cooking operation. Once the time setting has expired, the appliance 10 automatically reduces power to the heating element 24 to put the unit in a WARM setting. The unit will stay in the WARM setting until the user pushes the OFF button or unplugs the unit. Of course, other programming schemes are possible.

Preferably, the user cannot set the unit initially in the WARM setting. The system will only go to WARM after one of the time functions has expired. This avoids possible food safety problems that may be associated with cooking food only on the WARM setting. Pressing the OFF switch S1 any time the unit is on preferably removes power from the heating element 24 and extinguishes all indicator LEDs 262.

Figure 5:
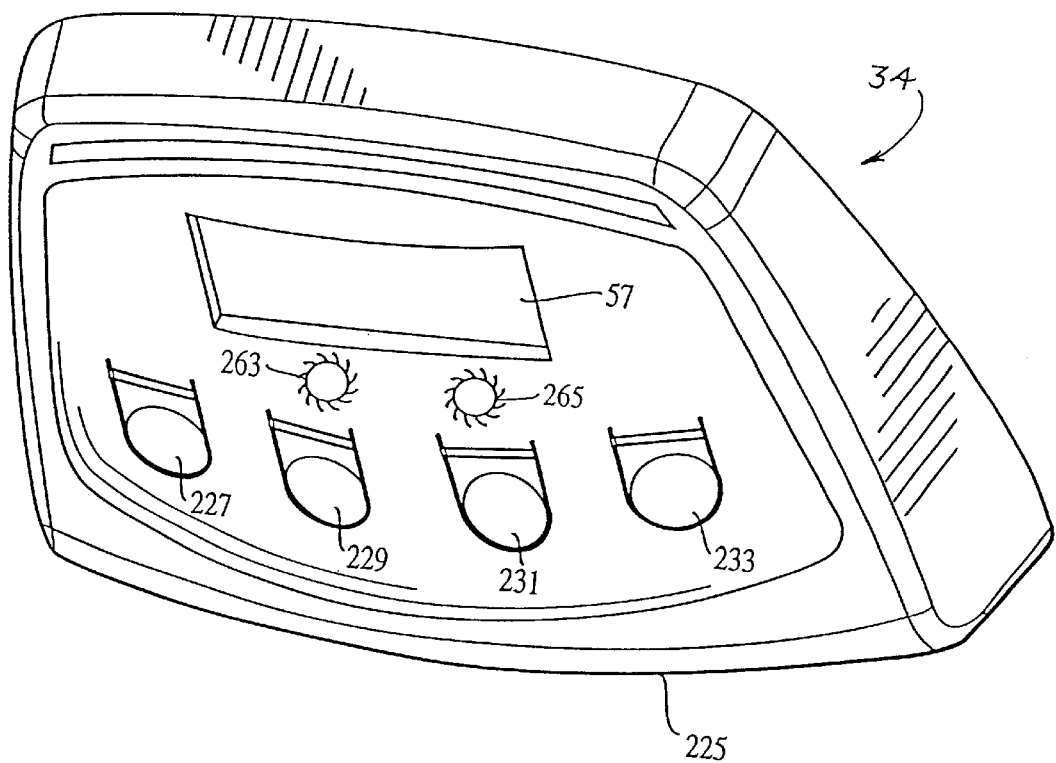
FIG. 5 is another embodiment of a user interface.
Figure 6:
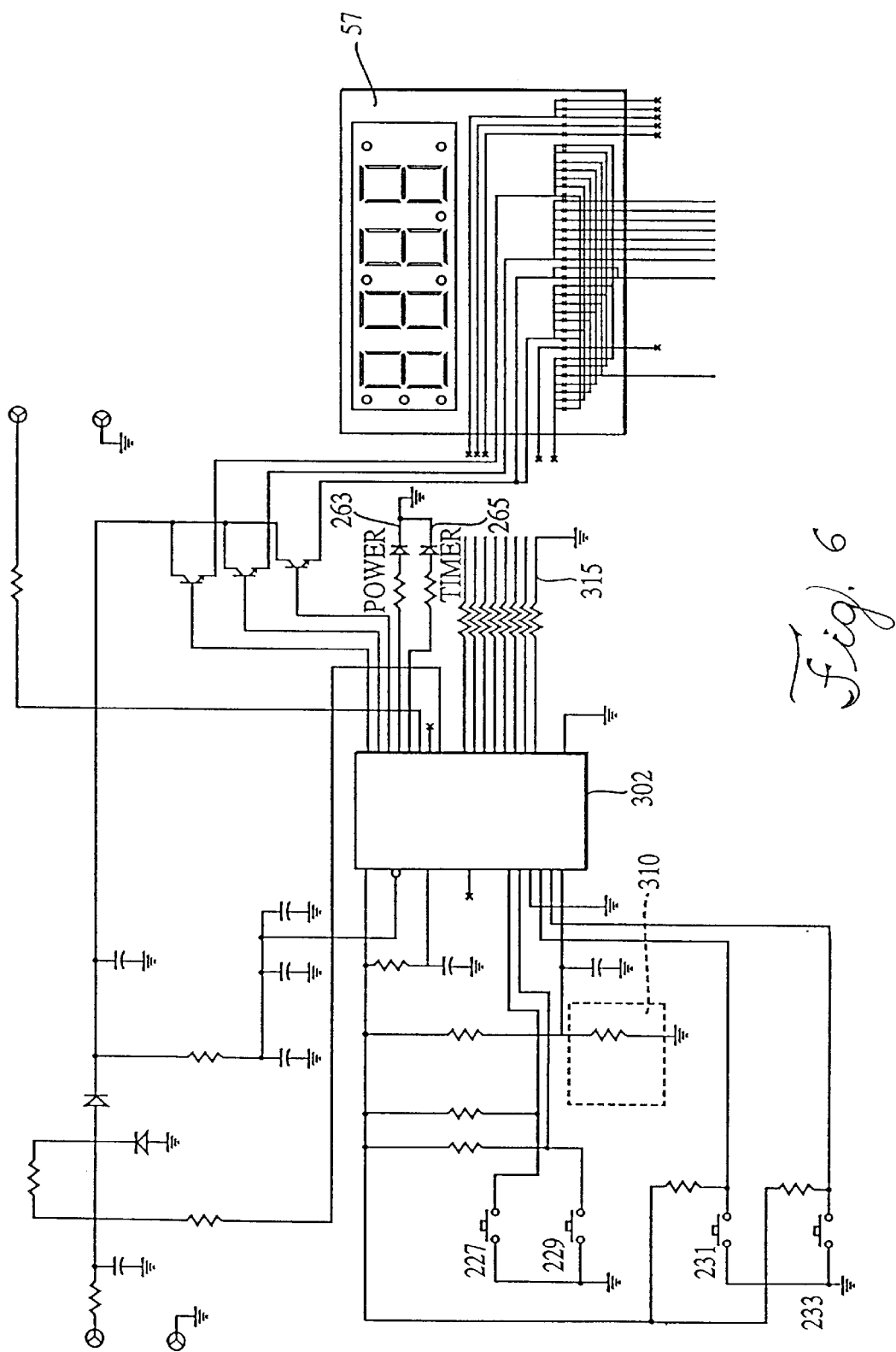
FIG. 6 is an embodiment of control circuitry for the accessory of FIG. 5.

In another embodiment, the slow-cooker appliance accessory has a different user interface 34 that utilizes four push-button switches, rather than two, to set times and temperatures for cooking. An exemplary control panel 34 is depicted in FIG. 5, with control circuitry in FIG. 6. Four momentary pushbutton contact switches 227, 229, 231, 233 are used to trigger various power and setting functions as will be described in the cooking procedure below. Of course, other numbers or types of indicators and switches may be substituted as well. FIG. 6 shows circuitry applicable to such an embodiment, incorporating controller 302, external temperature element 310, digital readout 57, and Power LED 263 and Timer LED 265. The Power LED indicates power is present at the microprocessor controller and the Timer LED indicates that the Timer function is on and working.

The operation of the appliance is as follows. The programmable circuitry allows the user to set both the temperature and the desired cooking time. The functions of the switches 227, 229, 231, 233 on an alternative embodiment of a control panel user interface 225, are as follows:

227. ON/OFF power pushbutton—turns the appliance on and off.
229. TIMER pushbutton—activates stepped timer.
231. UP pushbutton—increases displayed numerical value.
233. DOWN pushbutton—decreases displayed numerical value.

When the unit is plugged in, the unit defaults to 150-degrees F. as shown on the digital display 57. The user may adjust the desired cooking temperature in 25-degree increments using the UP 231 button or the DOWN button 233, with 150 degrees Fahrenheit as a minimum temperature. Once the user has selected the specific temperature, the appliance will start the cooking process.

The user may also select the TIMER mode by pressing the TIMER button 229. In TIMER mode, the controller defaults to 4 hours. The user can use the UP or DOWN controls to increase or decrease the time in 15-minute increments. Once the time is set, the controller 302 will count down the time remaining for cooking in 1 minute increments until the unit "times out". At that time, the power is shut off from the heating element. Some embodiments may have a timer and settings, such as "high" and "warm" only.

In embodiments having a temperature feedback, the temperature is read periodically by the thermistor or other temperature element and relayed to the controller. The reading is checked at 4-second intervals. If the temperature is above or equal to the set point, power is removed. If it is below the set point, power is applied to the heating element 32. Of course, the circuitry can be modified as desired to achieve various program methods and modes.

Another embodiment of the slow cooker appliance adds a piezobuzzer to the circuitry. A piezobuzzer is simply an electrically-activated buzzer that can be programmed to emit a sound at desired moments. In one embodiment, a piezobuzzer may be installed as an output 315, controlled by the microprocessor controller 302, as shown in FIG. 6, and programmed to emit a sound when desired. In one embodiment, the buzzer may beep to provide feedback to a user when a pushbutton is pushed. The cooker may also be programmed to emit a sound to indicate the end of the cooking time. The buzzer may also be used to emit sounds at other desired times.

Figure 7:
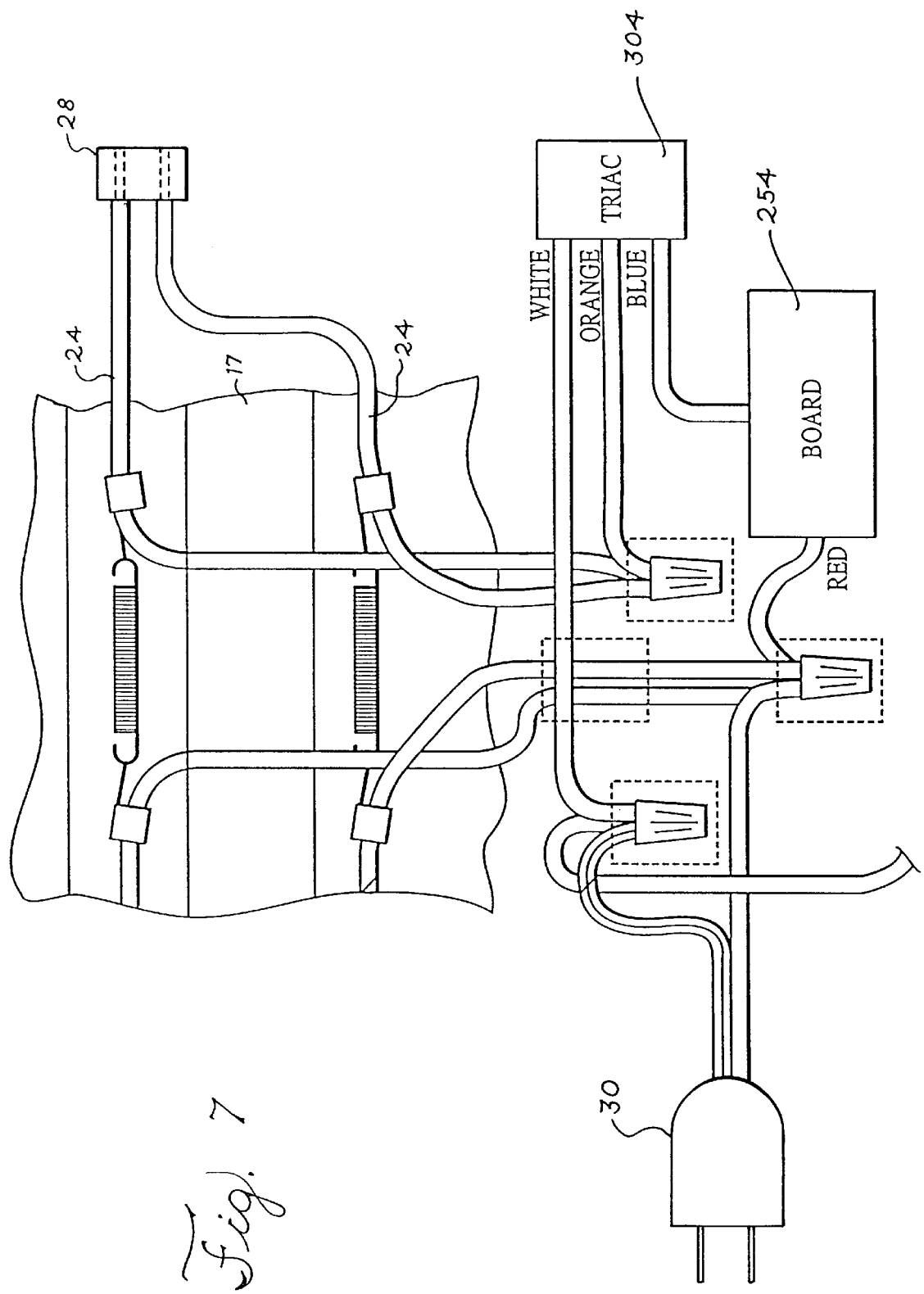
FIG. 7 is an embodiment of power wiring for an accessory.

FIG. 7 depicts one embodiment of wiring for the add-on accessory. Male plug 30, suitable for plugging into a kitchen electrical outlet, brings power into the accessory, suitable for providing power for a circuit board 254 and other electrical devices requiring power within the accessory. The microprocessor controller controls triac 304 which provides power via connecting wires 24 to female outlet 28, suitable for powering and controlling a desired time and temperature for a slow-cooker appliance. In another embodiment, a second triac (not shown) and female outlet (not shown) may control an additional slow-cooker appliance by providing a second control circuit and power outlet to the programmable slow-cooker accessory.

It is intended that the foregoing description illustrates rather than limits this invention, and that it is the following claims, including all equivalents, which define this invention. Of course, it should be understood that a wide range of changes and modifications may be made to the embodiments described above. Accordingly, it is the intention of the applicants to protect all variations and modifications within the valid scope of the present invention. It is intended that the invention be defined by the following claims, including all equivalents.

What is claimed is:

1. A programmable slow cooker accessory, comprising:
   a housing;
   a female electrical connector on said housing;
   a controller within said housing for allowing a user to set the cooking temperature and cooking time of a slow cooker when the slow cooker is plugged into said female electrical connector;
   a control panel on said housing and having user-engageable control elements for controlling said controller, and
   a male electrical connector for connection to a wall electrical outlet and for providing power to said controller.

2. The programmable slow cooker accessory of claim 1 wherein said controller is configured to cause a slow cooker to operate at a relatively high cooking temperature if the user selects a first cooking time and at a relatively low cooking temperature is the user selects a second cooking time longer than said first cooking time.

3. The programmable slow cooker accessory of claim 1 wherein said control panel includes a pushbutton for operating a cook switch, said controller being configured to set a different cooking time upon subsequent pushes of said pushbutton by a user.

4. The programmable slow cooker accessory of claim 3 wherein said controller is configured to set a different cooking temperature as well as a different cooking time upon subsequent pushes of said pushbutton by a user.

5. A programmable slow cooker assembly comprising:
   a slow cooker appliance including a heating unit having a well-like heating chamber and an electrical cord and a plug-in connector attached to said cord for connecting said heating unit to an electrical outlet, said heating unit lacking a timer;
   a cooking vessel positioned within said heating chamber; and
   a programmable slow cooker accessory including a controller for allowing a user to set the cooking temperature and cooking time of said slow cooker appliance, a female electrical connector for receiving said plug-in connector of said heating units, and a male electrical connector for connection to a wall electrical outlet and for providing power to said controller.

6. The programmable slow cooker assembly of claim 5 wherein said programmable slow cooker accessory includes a housing for said controller, said housing including a control panel, said control panel being operatively connected to said controller.

7. The programmable slow cooker assembly of claim 6 wherein said controller is configured to cause said heating unit to operate at a relatively high cooking temperature if the user selects a first cooking time and at a relatively low cooking temperature if the user selects a second cooking time longer than said first cooking time.

8. The programmable slow cooker assembly of claim 7 wherein said control panel includes a pushbutton for operating a cook switch, said controller being configured to set a different cooking time upon subsequent pushes of said pushbutton by a user.

9. The programmable slow cooker assembly of claim 8 wherein said controller is configured to set a different cooking temperature as well as a different cooking time upon subsequent pushes of said pushbutton by a user.

10. A method of operating a slow cooker appliance including a heating unit having a well-like heating chamber and a cooking vessel in said heating chamber, an electrical cord and a plug-in connector attached to said electrical cord for connecting said heating unit to an electrical outlet, comprising:

provided a programmable slow cooker accessory including a controller for allowing a user to set the cooking temperature and cooking time of said slow cooker appliance, a female electrical connector for receiving said plug-in connector and a male electrical connector for connection to a wall outlet and for providing power to said controller;

inserting said plug-in connector in said female electrical connector;

connecting said male electrical connector to a wall outlet, and setting a cooking time and cooking temperature for said heating unit by operating said controller.

11. The method of claim 10 wherein said programmable slow cooker assembly includes a control panel operatively connected to said controller and said controller is configured to cause said heating unit to operate at a relatively high cooking temperature if the user selects a first cooking time and at a relatively low cooking temperature if the user selects a second cooking time longer than said first cooking time, comprising:

causing said control panel to select one of said first cooking time and said second cooking time, and automatically operating said heating unit at one of said relatively high cooking temperature and said relatively low cooking temperature depending on which of said first cooking time or second cooking time has been selected.

12. The method of claim 11 wherein said control panel includes a pushbutton for operating a cook switch, said controller being configured to set a different cooking time upon subsequent pushes of said pushbutton by a user, comprising:

displacing said pushbutton a plurality of times to set said cooking time.

13. The method of claim 12 wherein said controller is configured to increase the cooking time upon successive pushes of said pushbutton, including the step of displacing said pushbutton a plurality of times and thereby causing said cooking time to be increased by a selected increment.

14. The method of claim 12 including the step of placing said cooking vessel in said heating chamber.

* * * * *